US006304621B1

United States Patent
Samueli et al.

(10) Patent No.: US 6,304,621 B1
(45) Date of Patent: *Oct. 16, 2001

(54) MULTI-MODE VARIABLE RATE DIGITAL CABLE RECEIVER

(75) Inventors: Henry Samueli, San Juan Capistrano; Loke K. Tan, Laguna Niguel; Jeffrey S. Putnam, Los Angeles, all of CA (US)

(73) Assignee: Broadcom Corporation, Irvine, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,102

(22) Filed: May 13, 1998

(51) Int. Cl.[7] ................................................ H04B 1/10
(52) U.S. Cl. .................................................. 375/350
(58) Field of Search ................................ 375/229, 232, 375/235, 261, 316, 320, 326, 327, 350, 285, 275, 284; 708/290, 300, 313, 322, 323

(56) References Cited

U.S. PATENT DOCUMENTS

| | | | |
|---|---|---|---|
| 3,962,637 | 6/1976 | Motley et al. | 375/42 |
| 4,597,089 | 6/1986 | Motley et al. | 375/13 |
| 4,599,732 | 7/1986 | LeFever | 375/13 |
| 4,707,841 | * 11/1987 | Yen et al. | 375/230 |

(List continued on next page.)

OTHER PUBLICATIONS

Joshi, Robindra B. et al., "WP 4.2: A 100 MHz, 5MBaud QAM Decision–Feedback Equalizer for Digital Television Applications,"*1994 IEEE International Solid–State Circuits Conference*, ISSCC94/Session 4/Video and Communication Signal Processors/Paper WP 4.2, pp. 68–69.

Martin, James et al., "Local Area Networks Architectures and Implementations," Second Edition, 1994, pp. 167–170, 204, Prentice Hall, Englewood Cliffs, New Jersey.

Razavi, Behzad, "Monolithic Phase–Locked Loops and Clock Recovery Circuits," 1996, pp. 2–7, Tutorial, IEEE Press, New York, New York.

(List continued on next page.)

*Primary Examiner*—Chi Pham
*Assistant Examiner*—Emmanuel Bayard
(74) *Attorney, Agent, or Firm*—Christie, Parker & Hale, LLP (57) ABSTRACT

Carrier signals modulated by information (video and/or data) signals are received through a cable and are converted to modulated signals at an intermediate frequency. The IF signals are sampled at a particular frequency to produce digital information signals. The digital information signals are introduced to a variable interpolator which produces first digital signals. The first digital signals are introduced to a complex multiplier which produces second digital signals. The second digital signals pass to an adaptive equalizer which selects for each of the second signals in accordance with the amplitude of such second signals, an individual one of a multitude of amplitude levels involved in quadrature amplitude modulation. These selected amplitude levels represent the information (video and/or data). The output signals from the adaptive equalizer are introduced to a first signal recovery loop which includes a first numerically controlled oscillator. The oscillator operates upon the variable interpolator to obtain the production by the variable interpolator of the first digital signals in the correct subinterval of the time period that each of the digital information signals is produced. The output signals from the adaptive equalizer are also introduced to a second signal recovery loop which includes a second numerically controlled oscillator. This oscillator operates upon the complex multiplier to maintain the frequency of the second digital signals at the frequency of the digital information signals.

23 Claims, 7 Drawing Sheets

U.S. PATENT DOCUMENTS

| | | | | |
|---|---|---|---|---|
| 4,864,590 | | 9/1989 | Arnon et al. | 375/14 |
| 5,003,555 | | 3/1991 | Bergmans | 375/12 |
| 5,031,194 | | 7/1991 | Crespo et al. | 375/14 |
| 5,065,412 | | 11/1991 | Schenk | 375/111 |
| 5,230,012 | | 7/1993 | Schenk | 375/111 |
| 5,276,711 | | 1/1994 | Rossi | 375/106 |
| 5,282,019 | * | 1/1994 | Basile et al. | 358/12 |
| 5,444,712 | | 8/1995 | Betts et al. | 370/110.1 |
| 5,495,203 | * | 2/1996 | Harp et al. | 329/306 |
| 5,504,785 | | 4/1996 | Becker et al. | 375/344 |
| 5,559,840 | | 9/1996 | Melas et al. | 375/355 |
| 5,604,741 | | 2/1997 | Samueli et al. | 370/402 |
| 5,617,450 | | 4/1997 | Kakuishi et al. | 375/230 |
| 5,638,409 | | 6/1997 | Awata et al. | 375/355 |
| 5,724,397 | | 3/1998 | Torsti | 375/355 |
| 5,748,674 | | 5/1998 | Lim | 375/233 |
| 5,793,821 | * | 8/1998 | Norrell et al. | 375/355 |
| 5,805,619 | * | 9/1998 | Gardner et al. | 714/814 |
| 5,870,438 | * | 2/1999 | Olafsson | 375/344 |
| 5,966,415 | * | 10/1999 | Bliss et al. | 375/350 |
| 6,005,640 | * | 12/1999 | Strolle et al. | 348/726 |
| 6,055,280 | * | 4/2000 | Genrich | 375/325 |

OTHER PUBLICATIONS

Anderson, John B., "Digital Transmission Engineering, 1999," pp. 193–199, Synchronization—Chapter 4,, IEEE Press, Prentice Hall, New Jersey.

Gardner, Floyd M., "Interpolation in Digital Modems–Part 1: Fundamentals," *IEEE Transactions on Communications*, Mar. 1993, pp. 501–507, vol. 41, No. 3, IEEE.

Harris, Fred, "On the Relationship Between Multirate Polyphase FIR Filters and Windowed , Overlapped, FFT Processing," *Proceedings of the Twenty–Third Asilomar Conference on Signals, Systems and Computers*, Oct. 30–Nov. 1, 1989, pp. 485–488, Maple Press.

Harris, Fred, et al., "Modified Polyphase Filter Structure for Computing Interpolated Data As Successive Differential Corrections," *Proceedings of the 1991 International Symposium on Circuits and Systems*, Jun. 11–14, 1991, pp. 2753–2756, Singapore.

Crochiere, Ronald E., et al., "Multirate Digital Signal Processing," 1983, Prentice–Hall, Englewood Cliffs, New Jersey.

\* cited by examiner

MULTI-MODE VARIABLE RATE DIGITAL CABLE RECEIVER

This invention relates to a system for, and method of receiving information (e.g., video and/or data) signals transmitted through a cable from a plurality of television stations each operative in an individual frequency range and for recovering the information represented by the information signals.

BACKGROUND OF THE INVENTION

Systems have been in existence for a number of years for receiving signals from a plurality of television stations and for transmitting these signals through a cable to a subscriber. Each of the television stations provides signals in an individual range of frequencies. For example, the signals from the different television stations may have different frequencies in a range between approximately fifty megahertz (50 MHz) to approximately eight hundred and fifty megahertz (850 MHz). The signals from the different television stations in the frequency range of approximately 50–850 MHz modulate a carrier signal having a suitable carrier frequency.

The television receivers then convert the carrier signals to signals at an intermediate frequency such as approximately forty-four megahertz (44 MHz). These intermediate frequency (IF) signals are then demodulated at the television receivers and the demodulated signals are processed to recover the data signals from the individual ones of the television stations. The processing of the signals occurs on an analog basis.

It is well recognized that the processing of the signals on an analog basis to recover the information in the information signals is not as precise as would ordinarily be desired. The recovery of such information on a precise basis by analog techniques is especially difficult in view of the fact that the information signals are encoded using quadrature amplitude modulation (QAM) with a multitude of amplitude levels.

BRIEF DESCRIPTION OF THE INVENTION

In one embodiment of the invention, carrier signals modulated by information (video and/or data) signals are received through a cable and are converted to modulated signals at an intermediate frequency. The IF signals are sampled at a particular frequency to produce digital information signals. The digital information signals are introduced to a variable interpolator which produces first digital signals. The first digital signals are introduced to a complex multiplier which produces second digital signals. The second digital signals pass to an adaptive equalizer which selects, for each of the second signals in accordance with the amplitude of such second signals, an individual one of a multitude of amplitude levels involved in quadrature amplitude modulation. These selected amplitude levels represent the information (video and/or data).

The output signals from the adaptive equalizer are introduced to a first signal recovery loop which includes a first numerically controlled oscillator. The oscillator operates upon the variable interpolator to obtain the production by the variable interpolator of the first digital signals in the correct subinterval of the time period that each of the digital information signals is produced. The output signals from the adaptive equalizer are also introduced to a second signal recovery loop which includes a second numerically controlled oscillator. This oscillator operates upon the complex multiplier to maintain the frequency of the second digital signals at the frequency of the digital information signals.

DETAILED DESCRIPTION OF THE INVENTION

Figure 1:
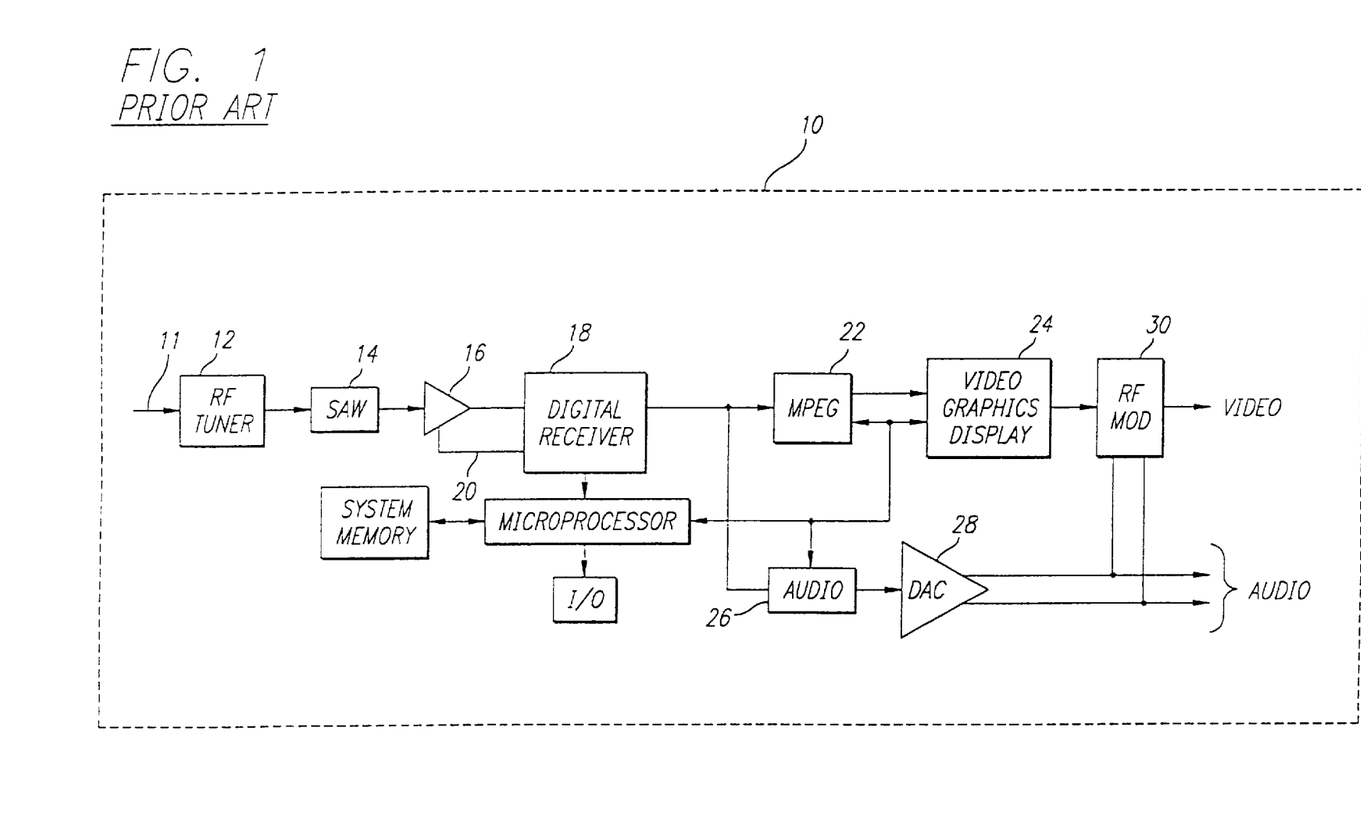
FIG. 1 is a block diagram of a prior art system, including a quadrature amplitude modulation receiver, for receiving television signals through a cable from a plurality of television channels and for converting the television signals for each channel to video and audio.

FIG. 1 is a block diagram of a system, generally indicated at 10 and including a quadrature amplitude modulation (QAM) receiver, for receiving television signals through a cable from a plurality of television channels and for converting the television signals for each channel to video and audio. The system 10 is well known in the prior art. The system 10 includes a tuner 12 for selecting, for a particular one of the channels or stations, the carrier signals modulated by information signals representing video and audio.

The signals from the tuner 12 are introduced to a surface acoustic filter wave (SAW) 14 which acts as a band pass filter to pass the signals within a particular intermediate frequency. The signals from the filter 14 then pass to an automatic gain control (AGC) stage 16 for regulating the power of the intermediate frequency signals. The signals are then introduced to a quadrature amplitude modulation receiver 18. The receiver 18 provides individual ones of a plurality (generally in the hundreds—e.g., 256) of amplitude and phase levels to represent the received information. The receiver 18 is able to provide individual ones of as many as 256 different amplitude and phase levels because the signals passing through the cable 11 are relatively strong, particularly in comparison to the signals passing from satellites. Feedback signals are introduced on a line 20 from the receiver 18 to the stage 16 to regulate the gain of the stage.

The video signals from the receiver 18 pass to a decompressor 22 which decompresses the received signals. The decompressor 22 may be an MPEG decompressor which is well known in the prior art. The decompressed signals pass to a video graphics display 24 which may be a conventional analog TV set.

The signals from the receiver 18 are also introduced to an audio decompressor 26 which may be an MPEG decompressor which is well known in the prior art. The signals from the decompressor 26 pass to a digital-to-analog converter 28. The output from the converter 28 provides the audio information. The signals from the converter 28 and from the decompressor 22 are introduced to an RF modulator 30. The video is provided from the output from the modulator 30 to a conventional TV set.

Figure 2:
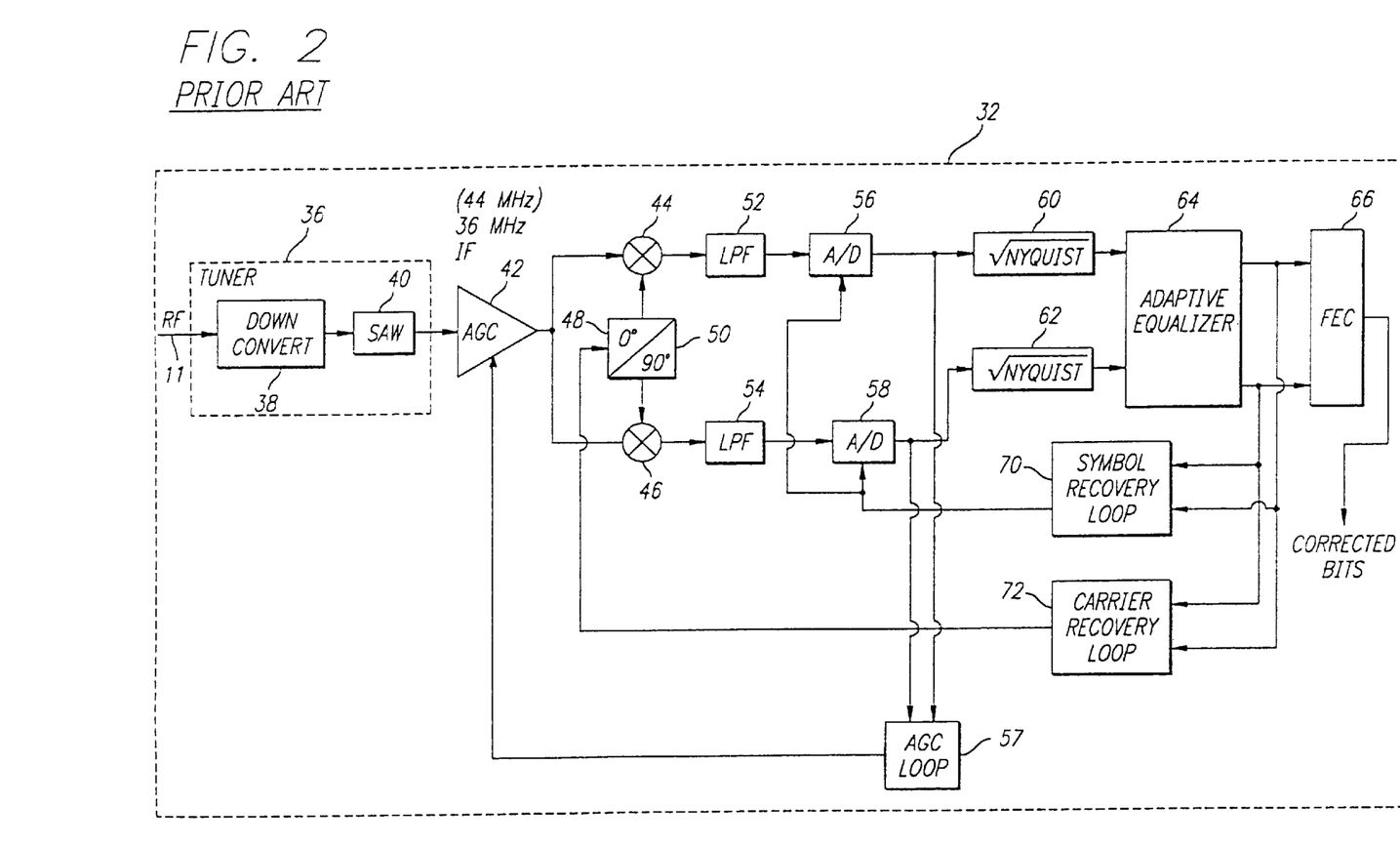
FIG. 2 is a block diagram of a quadrature amplitude modulated television receiver used in the prior art as the receiver of FIG. 1.

FIG. 2 illustrates in block form a traditional (prior art) receiver architecture, generally indicated at 32, for receiving RF signals through the cable 11. The signals in the cable 11 are introduced to a tuner 36 which is shown within broken lines in FIG. 2. The tuner 36 includes a down convert stage 38 and surface acoustic wave filter (SAW) 40. The stage 38 converts the signals at the carrier frequency to signals at an intermediate frequency such as forty-four megahertz (44 MHz) or thirty-six megahertz (36 MHz). The signals from the surface acoustic wave (SAW) 40 pass to an automatic gain control (AGC) stage 42.

A pair of multipliers 44 and 46 receives the gain control signals from the stage 42. The multiplier 44 also receives signals having the same frequency as the frequency of the signals from the stage 42 and having a phase of zero degrees (0°). This is indicated at 48. The multiplier 46 also receives signals having the same frequency as the frequency of the 18 signals from the stage 42 and having a phase of 90°. This is indicated at 50 in FIG. 2. Low pass filters 52 and 54 respectively limit the frequency of the signals from the stages 44 and 46.

Analog-to-digital converters 56 and 58 respectively convert the analog signals from the filters 52 and 54 to digital signals. The signals from the converters 56 and 58 are introduced to an automatic gain control loop 57 which operates in a conventional manner to regulate the gain of the signals from the stage 42.

The digital signals pass to filters 60 and 62 which may constitute suitable low pass filters such as Nyquist filters. The signals from the filters 60 and 62 are introduced to an adaptive equalizer 64. An adaptive equalizer suitable for use as the equalizer 64 is disclosed in detail in co-pending application Ser. No. 08/285,504 filed by Henry Samueli and Charles P. Reames on Aug. 3, 1997, for a "System for, and Method of, Processing Quadrature Amplitude Modulated Signals" and assigned of record to the assignee of record of this application.

The adaptive equalizer 64 may include a feed forward equalizer, a decision feedback equalizer and a slicer associated with these equalizers and providing amplitude approximations of increasing sensitivity at progressive times. In this way, the adaptive equalizer 64 selects, for each individual one of the signals introduced to the adaptive equalizer, an individual one of many (e.g., 16) of amplitude levels closest to the amplitude of such individual one of the signals introduced to the adaptive equalizer. The output from the adaptive equalizer 64 is introduced to a forward error correction (FEC) stage 66 which provides corrections to discovered errors in a manner well known in the art. The output from the forward error correction stage 66 represents the MPEG compressed television information.

The output from the adaptive equalizer 64 passes to a symbol recovery loop 70. The loop 70 operates on an analog basis and includes a first voltage controlled oscillator (not shown). The first voltage controlled oscillator produces a clock signal which is introduced to the converters 56 and 58 to adjust and regulate the frequency at which the analog signals from the filters 52 and 54 are converted to digital signals.

The output from the adaptive equalizer 64 also passes to a carrier loop 72. The loop 72 operates on an analog basis and includes a second voltage controlled oscillator. The second voltage controlled oscillator produces a sinusoidal signal which is introduced to the stage 48 to regulate the frequency at which the stage 48 is operated. In this way, the frequency of operation of the stage 48 is regulated to conform to the frequency of the signals that are introduced to the multiplier 44 from the automatic gain control stage 42.

As will be appreciated, the frequency of the signals in the stage 50 conforms to the frequency of the signals in the stage 48, but has a phase separated by 90° from the phase of the stage 48.

Figure 3A:
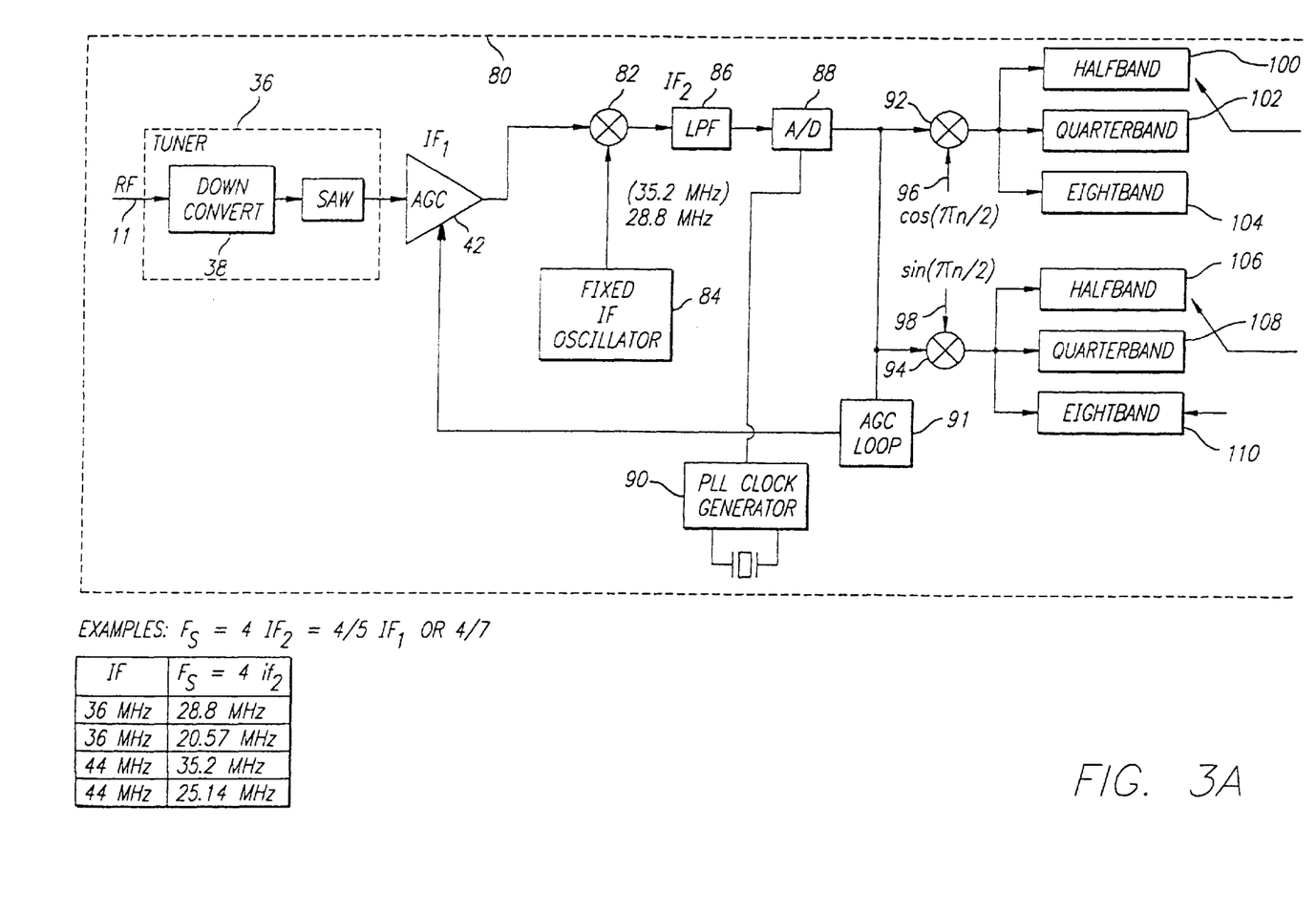
FIG. 3A–3B is a block diagram of a quadrature amplitude modulated receiver constituting one embodiment of the invention.
Figure 3B:
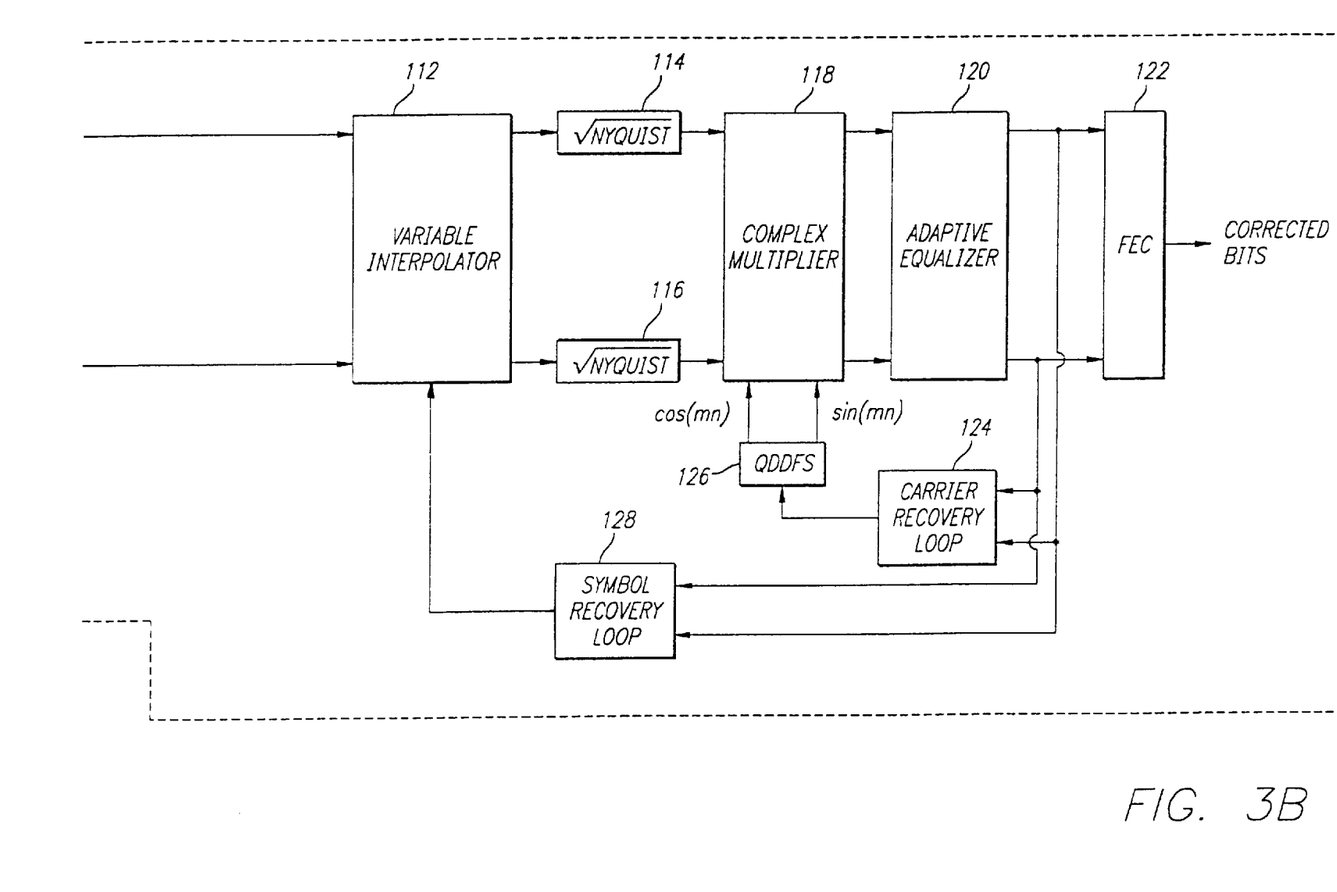

FIG. 3 illustrates one embodiment, generally indicated at 80, of an invention constituting one embodiment of the invention for providing a multi-mode variable rate digital cable receiver. The embodiment 80 includes the digital cable 11, the tuner 36 and the automatic gain control stage 42 also shown in FIG. 2. The signals from the stage 42 are introduced to a multiplier 82 as are the signals from a fixed oscillator 84 having a suitable frequency such as approximately 35.2 MHz or 28.8 MHz.

The signals from the multiplier 82 are introduced to a low pass filter 86. When the fixed oscillator 82 has a frequency of 28.8 MHz, the AGC stage 42 may have a center frequency of 36 MHz and the filter 86 may pass a range of frequencies to approximately 7.2 MHz. Similarly, when the fixed oscillator 82 has a frequency of 35.2 MHz, the AGC stage 42 may have a center frequency of 44 MHz and the filter 86 may pass a range of frequencies to approximately 8.8 MHz.

The signals from the filter 86 are introduced to an analog-to-digital converter 88 which also receives signals from a fixed oscillator in the form of a phase lock loop clock generator stage 90. The stage 90 may provide a signal at substantially the same frequency as the frequency of the signals from the AGC stage 42. An AGC loop 91 corresponding to the AGC loop 57 in FIG. 2 may be provided between the converter 88 and the AGC stage 42 to regulate the gain of the signals in the AGC stage.

The signals from the converter 88 are introduced to a pair of multipliers 92 and 94. The multiplier 92 also receives in-phase (or cosine) signals on a line 96 at the same frequency as the signals from the converter 88. The multiplier 94 also receives quadrature (or sine) signals on a line 98 at the same frequency as the signals from the converter 88. The signals from the multiplier 92 are introduced to filter stages 100, 102 and 104 respectively designated as "halfband", "quarterband" and "eighthband." In like manner, the signals from the multiplier 94 are introduced to filter stages 106, 108 and 110 respectively designated as "halfband," "quarterband" and "eighthband." The signals from the stages 106, 108 and 110 respectively have frequency ranges one half (½), one fourth (¼) and one eighth (⅛) of the frequency range of the signals from the multiplier 92.

The signals from selected one of the filters 100, 102 and 104 pass to a variable interpolator 112 as do the signals from a selected one of the filters 106, 108 and 110. The output from the variable interpolator 112 in turn passes to low pass filters 114 and 116. The filters 114 and 116 may constitute Nyquist filters which are well known in the art.

The outputs from the filters 114 and 116 are introduced to a complex multiplier 118. The complex multiplier 118 may be constructed in a manner similar to that disclosed in detail in co-pending application Ser. No. 09/013,964 filed in the United States Patent Office on Jan. 27, 1998 in the names of Henry Samueli, Alan Y. Kwentus and Thomas Kwon as joint inventors for a "Multi-Mode Variable Rate Digital Satellite Receiver" and assigned of record to the assignee of record of this application.

Connections are made from the outputs of the complex multiplier 118 to the inputs of an adaptive equalizer 120 corresponding in construction to the adaptive equalizer 64 shown in FIG. 2. The outputs from the adaptive equalizer 120 are introduced to a forward error correction stage (FEC)

stage 122 corresponding to the stage 66 in FIG. 2. The output from the stage 122 represents the MPEG compressed television information.

The outputs from the adaptive equalizer 120 are connected to a carrier recovery loop 124 which operates on a digital basis. The carrier recovery loop 124 may include a phase detector for detecting phase errors and may also include a loop filter. The output from the carrier recovery loop 124 passes to a quadrature direct digital frequency synthesizer (QDDFS) 126 which may be a numerically controlled oscillator providing two (2) output signals (e.g. cosine and sine) separated in phase by 90° from each other. The QDDFS 126 introduces the inphase (or cosine) and the quadrature (or sine) signals to the complex multiplier 118.

The signals from the adaptive equalizer 120 also pass to a symbol recovery loop 128 which operates on a digital basis. The symbol recovery loop 128 may include a phase detector and a loop filter as in the carrier recovery loop 124. The symbol recovery loop 128 may also include a numerically controlled oscillator. The output from the numerically controlled oscillator is introduced to the variable interpolator 112.

The tuner 36, the multiplier 82 and the low pass filter 86 operate to reduce the frequency of the RF signals passing through the cable 11. The analog-to-digital converter stage 88 oversamples the analog signals from the low pass filter 86 in converting the analog signals to digital signals. The digital signals are then converted to in-phase signals in the multiplier 92 and to quadrature signals in the multiplier 94.

The signals from the multiplier 92 then pass through a selective one of the filters 100, 102 and 104 depending upon the rate at which the signals are being produced. For example, the half band filter 100 passes the signals when the symbol rate is approximately seven (7) megabaud. The quarterband filter 102 passes the signals when the symbol rate is between approximately 3.5 megabaud and 7 megabaud. The eighth band filter 104 passes the signals when the symbol rate is between approximately 1.75 megabaud and 3.5 megabaud.

Figure 5:
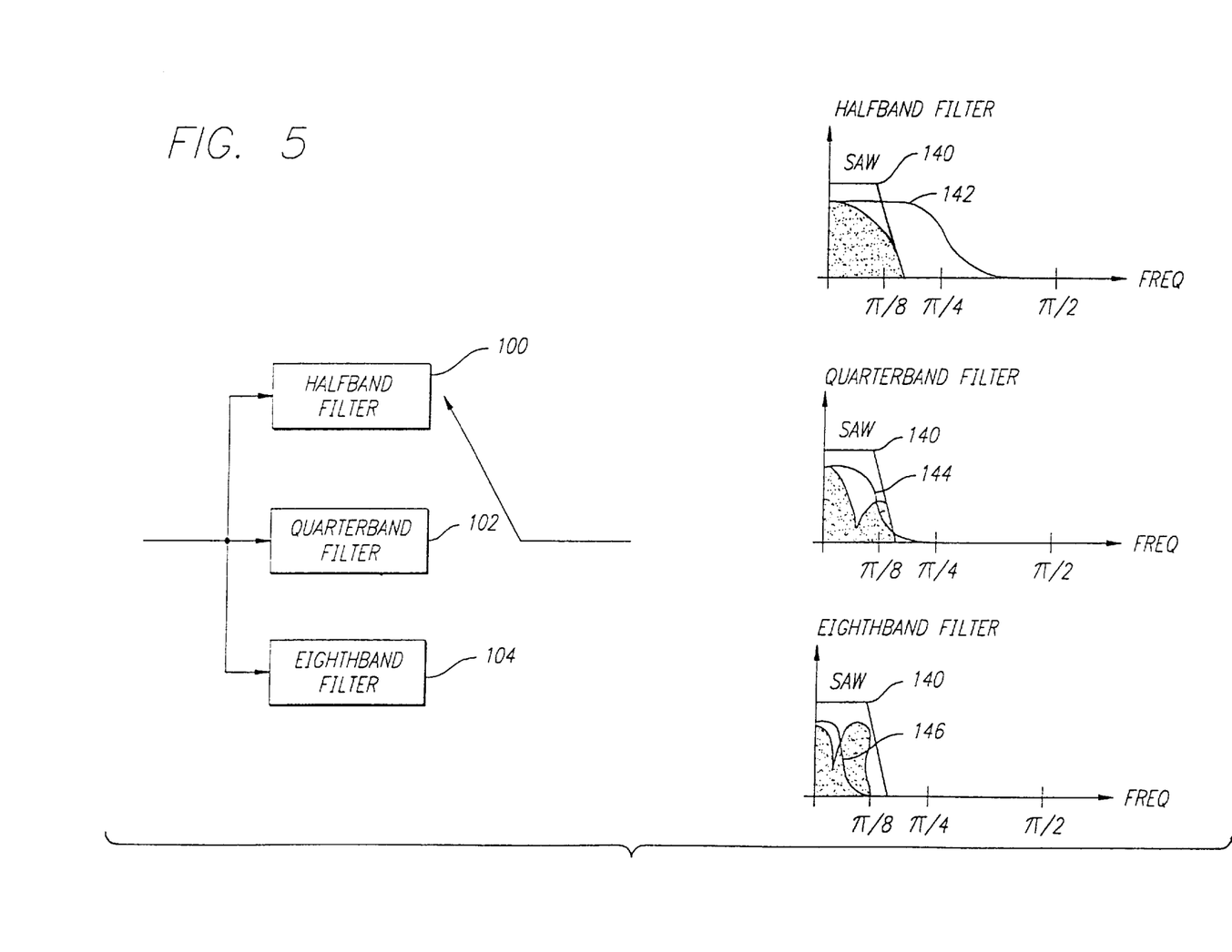
FIG. 5 is a block diagram of an arrangement formed by a plurality of filters for providing a selection between adjacent television channels and shows the signals produced by each of the adjacent channels.

FIG. 5 shows the half band filter 100, the quarter band filter 102 and the eighth band filter 104. FIG. 5 also includes a curve 140 showing the range of frequencies passed by the surface acoustic wave filter 40, a curve 142 showing the range of symbol frequencies passed by the half band filter 100, a curve 144 showing the range of symbol frequencies passed by the quarter band filter 102 and a curve 146 showing the range of symbol frequencies passed by the eighth band filter 104. FIG. 5 also shows by darkened areas the range of frequencies of adjacent channels for each individual one of the half band filter 100, the quarter band filter 102 and the eighth band filter 104. By way of illustration, the band of frequencies for a channel when using the half band filter 100 may correspond to the range of frequencies of the darkened area in the top curve in FIG. 5.

The variable interpolator 112 in FIG. 3 operates on the selective one of the filters 100, 102 and 104 and the selective one of the filters 106, 108, and 110 to pass the signals from the selective ones of these filters. The symbol recovery loop 128 operates digitally to regulate the operation of the variable interpolator 112 in passing the signals from the selective ones of the filters 100, 102 and 104 and the selective one of filters 106, 108 and 110 in the correct subinterval of the symbol periods that the digital signals are produced by the converter 88. As previously disclosed, the symbol recovery loop 128 includes a numerically controlled oscillator for operating upon the signals from the adaptive equalizer 120 to produce error signals for regulating the phase of the signals passing through the variable interpolator 112. This regulation provides for the passage of these signals through the variable interpolator 112 in the correct subinterval of the symbol periods that the digital signals are produced by the converter 88.

The complex multiplier 118 operates on a digital basis to translate the frequency of the digital data signals to a zero carrier frequency. As previously disclosed, the carrier recovery loop 124 includes the quadrature direct digital frequency synthesizer (QDDFS) 126 for operating upon the signals from the adaptive equalizer 120 to produce error signals for regulating the frequency of the signals passing through the complex multiplier 118.

In the system shown in FIG. 3, the variable interpolator 112 is disposed in front of the complex multiplier 118 in the progression of stages in the system. This is in contrast to the relative dispositions of the variable interpolator and the complex multiplier in the satellite receiver disclosed and claimed in co-pending application filed Jan. 27, 1998 in the names of Henry Samueli, Alan Y. Kwentus and Thomas Kwon as joint inventors for a "Multi-Mode Variable Rate Digital Satellite Receiver" and assigned of record to the assignee of record of this application.

The disposition of the variable interpolator 112 in front of the adaptive equalizer 120 offers certain advantages in the system of the invention when used to receive the television signals through a cable. One of the advantages of disposing the variable integrator 112 in front of the complex multiplier 118 in the system of this invention results from the fact that the carrier frequency error of the signals passing through the cable is relatively low. Because of this, the variable interpolator 112 and the symbol recovery loop 128 are able to regulate the frequency of the signals passing from the converter 88 quite closely before the signals are introduced to the complex multiplier 118.

The complex multiplier 118 and the carrier recovery loop 124 are then able to provide a further and more refined regulation in the frequency of the signals. In this way, the frequency of the signals can be precisely regulated to correspond to the frequency at which the digital signals are produced in the converter 88.

Figure 4A:
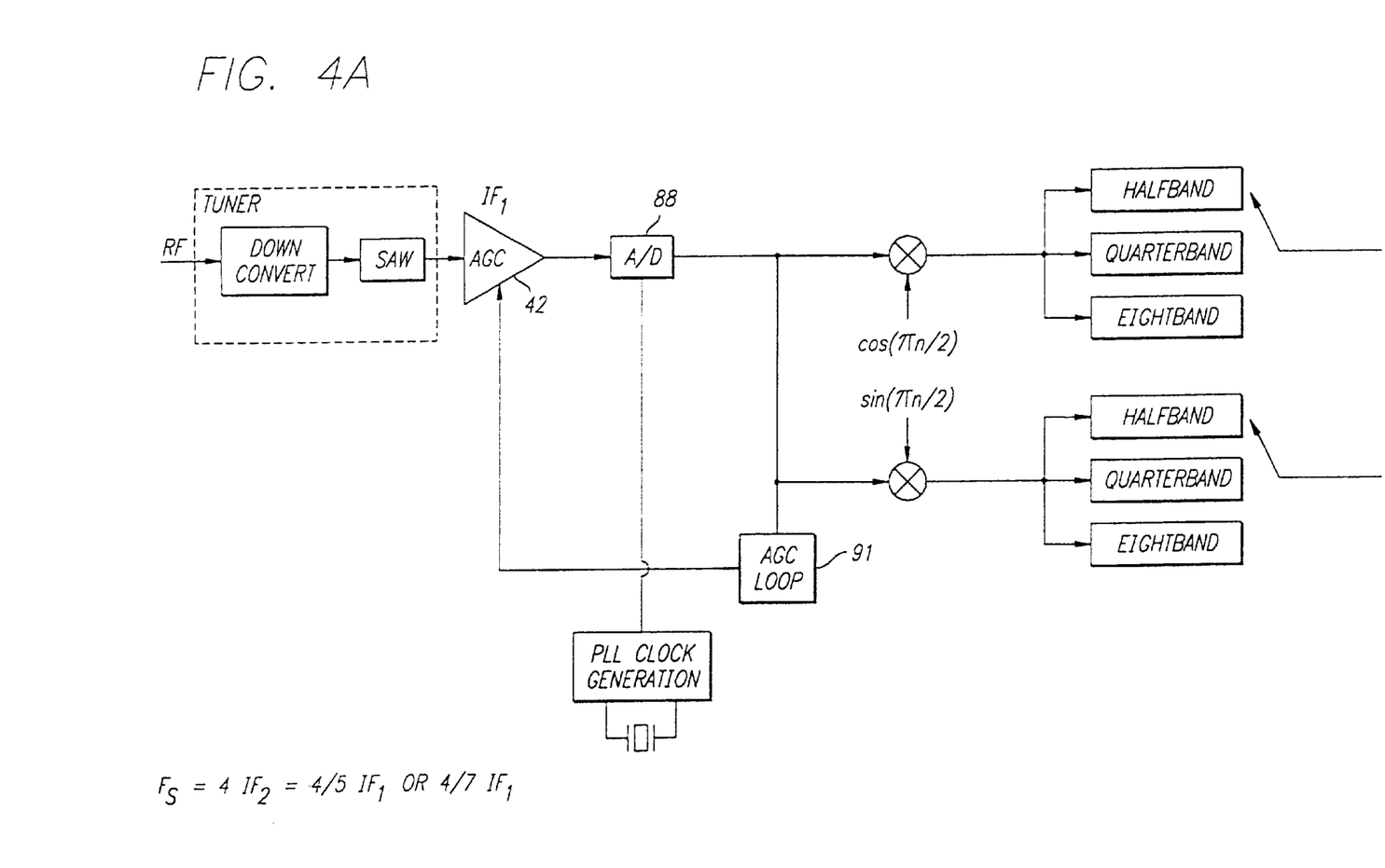
FIG. 4A–4B is a block diagram of a quadrature amplitude modulated receiver constituting a second embodiment of the invention.
Figure 4B:
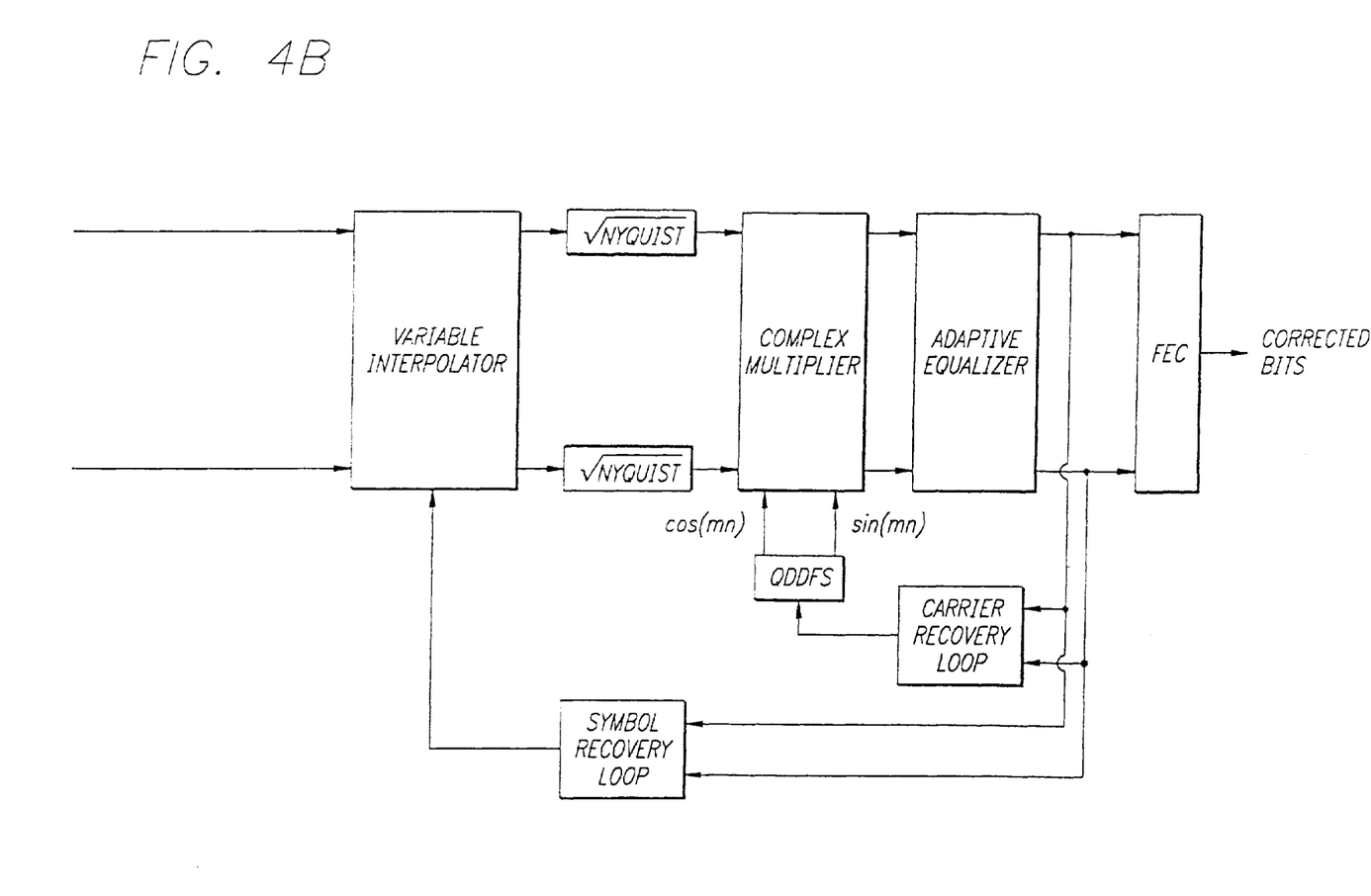

FIG. 4 shows a system which is similar in many respects to the system shown in FIG. 3. However, in the system shown in FIG. 4, the signals from the automatic gain control stage 42 are introduced directly to the analog-to-digital converter 88. This eliminates several stages from the embodiment shown in FIG. 3.

A variable interpolator for use as the variable interpolator 112 is known in the prior art. The variable interpolator 112 may be constructed in accordance with the disclosure in any of the following publications:

Gardner, Floyd M., "Interpolator in Digital Modems-Part 1: Fundamentals", IEEE Transactions on Communications, No. 3, March, 1993.

Harris, Fred, "On the Relationship Between Multirate Polyphase FIR Filters and Windowed, Overlapped, FFT Processing", Proceedings of the Twenty Third Asilomar Conference on Signals, Systems and Computers, Oct. 30–Nov. 1, 1989.

Harris, Fred, et al. "Modified Polyphase Filter Structure for Computing Interpolated Data As Successive Differential Corrections", Proceedings of the 1991 International Symposium on Circuits and Systems, Singapore, Jun. 11–14, 1991.

Crochiere, Ronald E, and Rabiner, Lawrence R., Multirate Digital Signal Processing, Englewood Cliff, N.J.: Prentice Hall, 1983.

U.S. Pat. No. 5,504,785—Apr. 2, 1996—Digital Receiver for Variable Symbol Rate Communications.

What is claimed is:

1. An apparatus for use in a multi-mode variable rate digital cable receiver, comprising:

first means for receiving through the cable carrier signals modulated by information signals in a particular frequency range, second means for reducing the frequency of the carrier signals to a particular intermediate frequency, third means for providing a digital conversion of the signals at the reduced frequency from the second means to obtain digital information signals, band selection filtering means responsive to the digital information signals for providing adjacent channel filtered digital data signals, p1 a variable interpolator responsive to the adjacent channel filtered digital data signals for providing first signals, a complex multiplier responsive to the first signals for providing second signals, a baseband adaptive equalizer responsive to the second signals for selecting, for each of the second signals, an individual one of a plurality of amplitude levels in quadrature amplitude modulation, fourth means responsive to the signals from the baseband adaptive equalizer for operating upon the variable interpolator to provide a sampling of the digital information signals for obtaining the first signals in the middle of the period that each of such digital information signals is produced, and fifth means responsive to the first signals from the baseband adaptive equalizer for operating upon the complex multiplier to maintain the frequency of the second signals at the frequency of the digital information signals.

2. In a combination as set forth in claim 1 wherein the fourth means includes a servo connected between the adaptive equalizer and the variable interpolator and including a numerically controlled oscillator for varying the frequency of the signals from the adaptive equalizer to provide the sampling of the digital information signal for obtaining the first signals in the correct subinterval of the period that each of such digital information signals is produced.

3. In a combination as set forth in claim 1 wherein the fifth means includes a servo connected between the adaptive equalizer and the complex multiplier and includes a quadrature direct digital frequency synthesizer for varying the frequency of the signals from the adaptive equalizer to maintain the frequency of the second signals at the frequency of the digital information signals.

4. In a combination as set forth in claim 1, sixth means responsive to the digital information signals for regulating the gain of the signals from the second means before the introduction of such signals at the particular intermediate frequency to the third means.

5. In a combination as set forth in claim 4 wherein the fourth means includes a servo connected between the adaptive equalizer and the variable interpolator and including a numerically controlled oscillator for varying the frequency of the signals from the adaptive equalizer to provide the sampling of the digital information signals for obtaining the first signals in the correct subinterval of the period that each of such digital information signals is produced, and the fifth means includes a servo connected between the adaptive equalizer and the complex multiplier and includes a quadrature direct digital frequency synthesizer for varying the frequency of the signals from the adaptive equalizer to maintain the frequency of the second signals at the frequency of the digital information signals.

6. In a combination as set forth in claim 1, sixth means responsive to the amplitude levels from the adaptive equalizer for reproducing the information represented by the modulated carrier signals.

7. In a combination as set forth in claim 5, means responsive to the amplitude levels from the adaptive equalizer for reproducing the information represented by the modulated carrier signals.

8. An apparatus for use in a multi-mode variable rate digital cable receiver, comprising:

first means for receiving through the cable carrier signals modulated by information in a particular frequency range, second means for converting the modulated carrier signals to digital information signals at a particular frequency, band selection filtering means responsive to the digital information signals for providing adjacent channel filtered digital data signals, a variable interpolator responsive to the adjacent channel filtered digital data signals for producing first signals, third means including a baseband adaptive equalizer for converting each of the first signals to an individual one of a plurality of amplitude levels involved in quadrature amplitude modulation, and fourth means responsive to the amplitude levels produced by the baseband adaptive equalizer for operating upon the variable interpolator to obtain the production by the variable interpolator of the first signals in the correct subinterval of the time period that each of the digital information signals is produced.

9. In a combination as set forth in claim 8, fifth means responsive to the signals from the first means for converting such signals to signals at an intermediate frequency and for introducing the signals at the intermediate frequency to the second means, sixth means responsive to the signals from the fifth means for providing a gain control of such signals, and seventh means responsive to the signals from the sixth means for regulating the operation of the sixth means in providing the gain control of such signals.

10. In a combination as set forth in claim 8, means including an adaptive equalizer responsive to the signals from the variable interpolator for producing second signals, and sixth means responsive to the amplitude levels produced by the adaptive equalizer for operating upon the complex multiplier to maintain the frequency of the second signals at the frequency of the digital information signals.

11. In a combination as set forth in claim 8 wherein the fourth means includes a symbol recovery loop responsive to the operation of the adaptive equalizer for generating signal s representing errors in the sampling of the digital information signals at times other than the correct subinterval of the time period that each of the digital information signals is produced and the symbol recovery loop further includes a numerically controlled oscillator responsive to the error signals from the symbol recovery loop for adjusting the operation of the variable interpolator to the production by the variable interpolator of the first signals in the correct subinterval of the time period that each of the digital information signals is produced.

12. In a combination as set forth in claim 11 wherein the symbol recovery loop also includes a phase detector and a loop filter and wherein the numerically controlled oscillator is responsive to the operation of the phase detector for generating the signals representing the errors in the sampling of the digital information signals at the times other than the correct subinterval of the time period that each of the digital data signals is produced.

13. In a combination as set forth in claim 9, fifth means including a complex multiplier responsive to the signals from the variable interpolator for producing second signals, sixth means responsive to the amplitude levels produced by the adaptive equalizer for operating upon the complex multiplier to maintain the frequency of the second signals at the frequency of the digital information signals, the symbol recovery loop also including a phase detector and a loop filter, and the numerically controlled oscillator being responsive to the operation of the phase detector for generating the signals representing the errors in the sampling of the digital information signals at the times other than the correct subinterval of the time period that each of the digital information signals is produced.

14. In a combination as set forth in claim 12, fifth means including a complex multiplier responsive to the signals from the variable interpolator for producing second signals, and sixth means responsive to the amplitude levels produced by maintaining the frequency of the second signals at the frequency of the digital information signals.

15. An apparatus for use in a multi-mode variable rate digital cable receiver, comprising:

first means for receiving through the cable carrier signals modulated by information in a particular frequency range, second means for converting the modulated carrier signals to digital information signals at a particular frequency, band selection filtering means responsive to the digital information signals for providing adjacent channel filtered digital data signals, third means, including a complex multiplier, responsive to the adjacent channel filtered digital data signals for producing first signals, a baseband adaptive equalizer for converting each of the first signals to an individual one of a plurality of amplitude levels involved in quadrature amplitude modulation, and fourth means responsive to the amplitude levels produced by the adaptive baseband equalizer for operating upon the complex multiplier to maintain the frequency of the first signals at the frequency of the digital information signals.

16. In a combination as set forth in claim 15, fifth means responsive to the signals from the first means for converting such signals to signals at an intermediate frequency and for introducing the signals at the intermediate frequency to the second means, sixth means responsive to the signals from the fifth means for providing a gain control of such signals, and seventh means responsive to the signals from the sixth means for regulating the operation of the sixth means in providing the gain control of such signals.

17. In a combination as set forth in claim 15, the fourth means includes a carrier recovery loop responsive to the operation of the adaptive equalizer for generating signals representing errors in the carrier frequency of the digital information signals and further includes a quadrature direct digital frequency synthesizer responsive to the error signals from the carrier recovery loop for adjusting the operation of the complex multiplier to obtain the production by the complex multiplier of the first signals at the frequency of the digital information signals.

18. In a combination as set forth in claim 17 wherein the carrier recovery loop also includes a phase detector and a loop filter and wherein the quadrature direct digital frequency synthesizer is responsive to the operation of the phase detector for generating the errors for adjusting the operation of the complex multiplier to obtain the production by the complex multiplier of the first signals at the frequency of the digital information signals.

19. In a combination as set forth in claim 16, the fourth means includes a carrier recovery loop responsive to the operation of the adaptive equalizer for generating signals representing errors in the carrier frequency of the digital information signals and further includes a quadrature direct digital frequency synthesizer responsive to the error signals from the carrier recovery loop for adjusting the operation of the complex multiplier to obtain the production by the complex multiplier of the first signals at the frequency of the digital information signals and wherein the carrier recovery loop also includes a phase detector and a loop filter and wherein the quadrature direct digital frequency synthesizer is responsive to the operation of the phase detector for generating the errors for adjusting the operation of the complex multiplier to obtain the production by the complex multiplier of the first signals at the frequency of the digital information signals.

20. In a combination as set forth in claim 15, including, a variable interpolator responsive to the digital information signals for producing second signals, and fifth means responsive to the amplitude levels produced by the adaptive equalizer for operating upon the variable interpolator to obtain the production by the variable interpolator of the second signals in the middle of the time period that each of the digital information signals is produced, the third means including the complex multiplier being responsive to the second signals from the fifth means for producing the first signals.

21. In a combination as set forth in claim 15, fifth means responsive to the signals from the first means for converting such signals to signals at an intermediate frequency and for introducing the signals at the intermediate frequency to the second means, sixth means responsive to the signals from the fifth means for providing a gain control of such signals, and seventh means responsive to the signals from the sixth means for regulating the operation of the sixth means in providing the gain control of such signals.

22. In a combination as set forth in claim 20, fifth means responsive to the signals from the first means for converting such signals to signals at an intermediate frequency and for introducing the signals at the intermediate frequency to the second means, sixth means responsive to the signals from the fifth means for providing a gain control of such signals, and seventh means responsive to the signals from the sixth means for regulating the operation of the sixth means in providing the gain control of such signals.

23. In a combination as set forth in claim 13, the fifth means including a symbol recovery loop responsive to the operation of the adaptive equalizer for generating signals representing errors in the sampling of the second signals at the times other than the middle of the time period that each of the digital information signals is produced and further includes a numerically controlled oscillator responsive to the error signals from the symbol recovery loop for adjusting the production by the symbol recovery loop of the second signals at the middle of the time period that each of the digital information signals is produced.

* * * * *

UNITED STATES PATENT AND TRADEMARK OFFICE
CERTIFICATE OF CORRECTION

PATENT NO.   : 6,304,621 B1
DATED        : October 16, 2001
INVENTOR(S)  : Samueli et al.

It is certified that error appears in the above-identified patent and that said Letters Patent is hereby corrected as shown below:

The title page, showing an illustrative figure should be deleted and substitute therefor the attached title page.

Delete Drawing Sheet 3 and substitute therefore the Drawing Sheet, consisting of Fig. 3A, as shown on the attached page.
Delete Drawing Sheet 5 and substitute therefore the Drawing Sheet, consisting of Fig. 4A, as shown on the attached page.

Title page,
Item [75], Inventors, delete "Henry Samueli, San Juan Capistrano", insert
-- Henry Samueli, Corona Del Mar --.
Item [56], References Cited, OTHER PUBLICATIONS,
"Anderson, John B.," reference, delete "Chapter 4,,", insert -- Chapter 4, --; and
"Harris, Fred," reference, delete "Windowed ,", insert -- Windowed, --.

Column 7,
Line 16, delete "signals, pl a variable", insert -- signals, a variable --.
Lines 35, 44 and 57, delete "In a combination", insert -- The apparatus --.
Lines 37, 39, 46, 49, 59 and 62, before "adaptive equalizer", insert -- baseband --.
Line 52, delete "In a combination as set forth in claim 1,", insert -- The apparatus as set forth in claim 1, further comprising: --.

Column 8,
Lines 2, 5, 10, 13, 53 and 59, before "adaptive equalizer", insert -- baseband --.
Line 8, delete "In a combination as set forth in claim 1,", insert -- The apparatus as set forth in claim 1, further comprising: --.
Line 12, delete "In a combination as set forth in claim 5,", insert -- The apparatus as set forth in claim 5, further comprising: --.
Lines 38 and 48, delete "In a combination as set forth in claim 8,", insert
-- The apparatus as set forth in claim 8, further comprising: --.
Line 49, delete "means including an adaptive", insert -- fifth means including a baseband adaptive --.
Line 57, delete "In a combination", insert -- The apparatus --.
Line 60, delete "signal s", insert -- signals --.

Column 9,
Line 6, delete "In a combination", insert -- The apparatus --.
Line 15, delete "In a combination as set forth in claim 9,", insert -- The apparatus as set forth in claim 9, further comprising: --.
Line 20, before "adaptive equalizer", insert -- baseband --.

UNITED STATES PATENT AND TRADEMARK OFFICE
CERTIFICATE OF CORRECTION

PATENT NO. : 6,304,621 B1
DATED : October 16, 2001
INVENTOR(S) : Samueli et al.

It is certified that error appears in the above-identified patent and that said Letters Patent is hereby corrected as shown below:

Column 9 (cont'd),
Line 32, delete "In a combination as set forth in claim 12,", insert -- The apparatus as set forth in claim 12, further comprising: --.

Column 10,
Line 1, delete "In a combination as set forth in claim 15,", insert -- The apparatus as set forth in claim 15, further comprising: --.
Line 11, delete "In a combination as set forth in claim 15,", insert -- The apparatus as set forth in claim 15, wherein --.
Lines 13, 33 and 54, before "adaptive equalizer", insert -- baseband --.
Lines 22 and 50, delete "In a combination", insert -- The apparatus --.
Line 31, delete "In a combination as set forth in claim 16,", insert -- The apparatus as set forth in claim 16, wherein --.

Column 11,
Line 1, delete "In a combination as set forth in claim 15,", insert -- The apparatus as set forth in claim 15, further comprising: --.
Line 12, delete "In a combination", insert -- The apparatus --.

Column 12,
Line 4, delete "In a combination as set forth in claim 13", insert -- The apparatus as set forth in claim 20 --.
Line 6, before "adaptive equalizer", insert -- baseband --.

Signed and Sealed this

Twenty-fifth Day of October, 2005

JON W. DUDAS
*Director of the United States Patent and Trademark Office*

(12) United States Patent
Samueli et al.

(10) Patent No.: US 6,304,621 B1
(45) Date of Patent: *Oct. 16, 2001

(54) MULTI-MODE VARIABLE RATE DIGITAL CABLE RECEIVER

(75) Inventors: Henry Samueli, San Juan Capistrano; Loke K. Tan, Laguna Niguel; Jeffrey S. Putnam, Los Angeles, all of CA (US)

(73) Assignee: Broadcom Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,102

(22) Filed: May 13, 1998

(51) Int. Cl.$^7$ ..................................................... H04B 1/10
(52) U.S. Cl. ................................................................ 375/350
(58) Field of Search ........................................ 375/229, 232, 375/235, 261, 316, 320, 326, 327, 350, 285, 275, 284; 708/290, 300, 313, 322, 323

(56) References Cited

U.S. PATENT DOCUMENTS

| | | | |
|---|---|---|---|
| 3,962,637 | 6/1976 | Motley et al. | 375/42 |
| 4,597,089 | 6/1986 | Motley et al. | 375/13 |
| 4,599,732 | 7/1986 | LeFever | 375/13 |
| 4,707,841 | * 11/1987 | Yen et al. | 375/230 |

(List continued on next page.)

OTHER PUBLICATIONS

Joshi, Robindra B. et al., "WP 4.2: A 100 MHz, 5MBaud QAM Decision–Feedback Equalizer for Digital Television Applications,"*1994 IEEE International Solid–State Circuits Conference*, ISSCC94/Session 4/Video and Communication Signal Processors/Paper WP 4.2, pp. 68–69.

Martin, James et al., "Local Area Networks Architectures and Implementations," Second Edition, 1994, pp. 167–170, 204, Prentice Hall, Englewood Cliffs, New Jersey.

Razavi, Behzad, "Monolithic Phase–Locked Loops and Clock Recovery Circuits," 1996, pp. 2–7, Tutorial, IEEE Press, New York, New York.

(List continued on next page.)

*Primary Examiner*—Chi Pham
*Assistant Examiner*—Emmanuel Bayard
(74) *Attorney, Agent, or Firm*—Christie, Parker & Hale, LLP (57) ABSTRACT

Carrier signals modulated by information (video and/or data) signals are received through a cable and are converted to modulated signals at an intermediate frequency. The IF signals are sampled at a particular frequency to produce digital information signals. The digital information signals are introduced to a variable interpolator which produces first digital signals. The first digital signals are introduced to a complex multiplier which produces second digital signals. The second digital signals pass to an adaptive equalizer which selects for each of the second signals in accordance with the amplitude of such second signals, an individual one of a multitude of amplitude levels involved in quadrature amplitude modulation. These selected amplitude levels represent the information (video and/or data). The output signals from the adaptive equalizer are introduced to a first signal recovery loop which includes a first numerically controlled oscillator. The oscillator operates upon the variable interpolator to obtain the production by the variable interpolator of the first digital signals in the correct subinterval of the time period that each of the digital information signals is produced. The output signals from the adaptive equalizer are also introduced to a second signal recovery loop which includes a second numerically controlled oscillator. This oscillator operates upon the complex multiplier to maintain the frequency of the second digital signals at the frequency of the digital information signals.

23 Claims, 7 Drawing Sheets

FIG. 3A

FIG. 4A